(12) United States Patent
Gosain et al.

(10) Patent No.: US 12,038,907 B1
(45) Date of Patent: Jul. 16, 2024

(54) APPARATUS AND METHODS FOR MAINTAINING DATA INTEGRITY FOR DATABASE MANAGEMENT

(71) Applicant: EYGS LLP, London (GB)

(72) Inventors: Sharad Gosain, New Delhi (IN); Tejas Jain, Faridabad (IN)

( * ) Notice: Subject to any disclaimer, the term of this patent is extended or adjusted under 35 U.S.C. 154(b) by 0 days.

(21) Appl. No.: 18/056,041

(22) Filed: Nov. 16, 2022

(51) Int. Cl.
*G06F 16/23* (2019.01)
*G06F 16/90* (2019.01)
*G06F 16/907* (2019.01)

(52) U.S. Cl.
CPC .......... *G06F 16/2365* (2019.01); *G06F 16/23* (2019.01); *G06F 16/90* (2019.01); *G06F 16/907* (2019.01)

(58) Field of Classification Search
CPC .... G06F 16/2365; G06F 16/907; G06F 16/23; G06F 16/90
USPC ......... 707/690, 705, 805, 812, 284; 705/317
See application file for complete search history.

(56) References Cited

U.S. PATENT DOCUMENTS

| | | | |
|---|---|---|---|
| 6,453,314 B1* | 9/2002 | Chan | G06F 16/2365 707/603 |
| 2010/0299372 A1* | 11/2010 | Djugash | G06F 16/2228 707/805 |
| 2011/0145210 A1* | 6/2011 | Rathinam | G06F 16/907 707/812 |
| 2012/0310850 A1* | 12/2012 | Zeng | G06Q 40/08 705/317 |
| 2017/0017696 A1* | 1/2017 | Alonso | G06F 16/907 |
| 2017/0046143 A1* | 2/2017 | Kochhar | G06F 8/71 |
| 2017/0193239 A1* | 7/2017 | Chari | G06F 21/577 |
| 2017/0322732 A1* | 11/2017 | Lissone | G06F 3/0673 |
| 2018/0018383 A1* | 1/2018 | Brunel | G06F 16/2282 |
| 2018/0095952 A1* | 4/2018 | Rehal | G06F 16/27 |
| 2018/0150377 A1 | 5/2018 | Oberle | |
| 2018/0181483 A1 | 6/2018 | Oberle | |
| 2018/0329967 A1* | 11/2018 | Lee | G06F 16/27 |
| 2018/0329974 A1* | 11/2018 | Bensberg | G06F 16/278 |
| 2020/0183812 A1* | 6/2020 | Eberlein | G06F 11/3664 |
| 2020/0183818 A1* | 6/2020 | Guenther | G06F 11/3664 |
| 2020/0310762 A1 | 10/2020 | Schreiber | |
| 2020/0334250 A1* | 10/2020 | Canim | G06F 16/2458 |
| 2020/0401572 A1* | 12/2020 | Mutha | G06F 16/907 |
| 2021/0065016 A1 | 3/2021 | Reimer et al. | |
| 2021/0334258 A1* | 10/2021 | Ofenloch | G06F 16/2282 |

* cited by examiner

*Primary Examiner* — Shahid A Alam
(74) *Attorney, Agent, or Firm* — COOLEY LLP

(57) ABSTRACT

In an embodiment, metadata representing a plurality of objects included in a database is received. A first set of objects from the plurality of objects that are compliant with a predetermined set of rules are identified using the metadata and not using the plurality of objects. A second set of objects from the plurality of objects that are not compliant with the predetermined set of rules are identified using the metadata and not using the plurality of objects. A risk associated with each object from the second set of objects is determined. Based on at least one risk associated with at least one object from the second set of objects, at least one recommendation to modify the at least one object to reduce non-compliance of the database is provided.

17 Claims, 16 Drawing Sheets

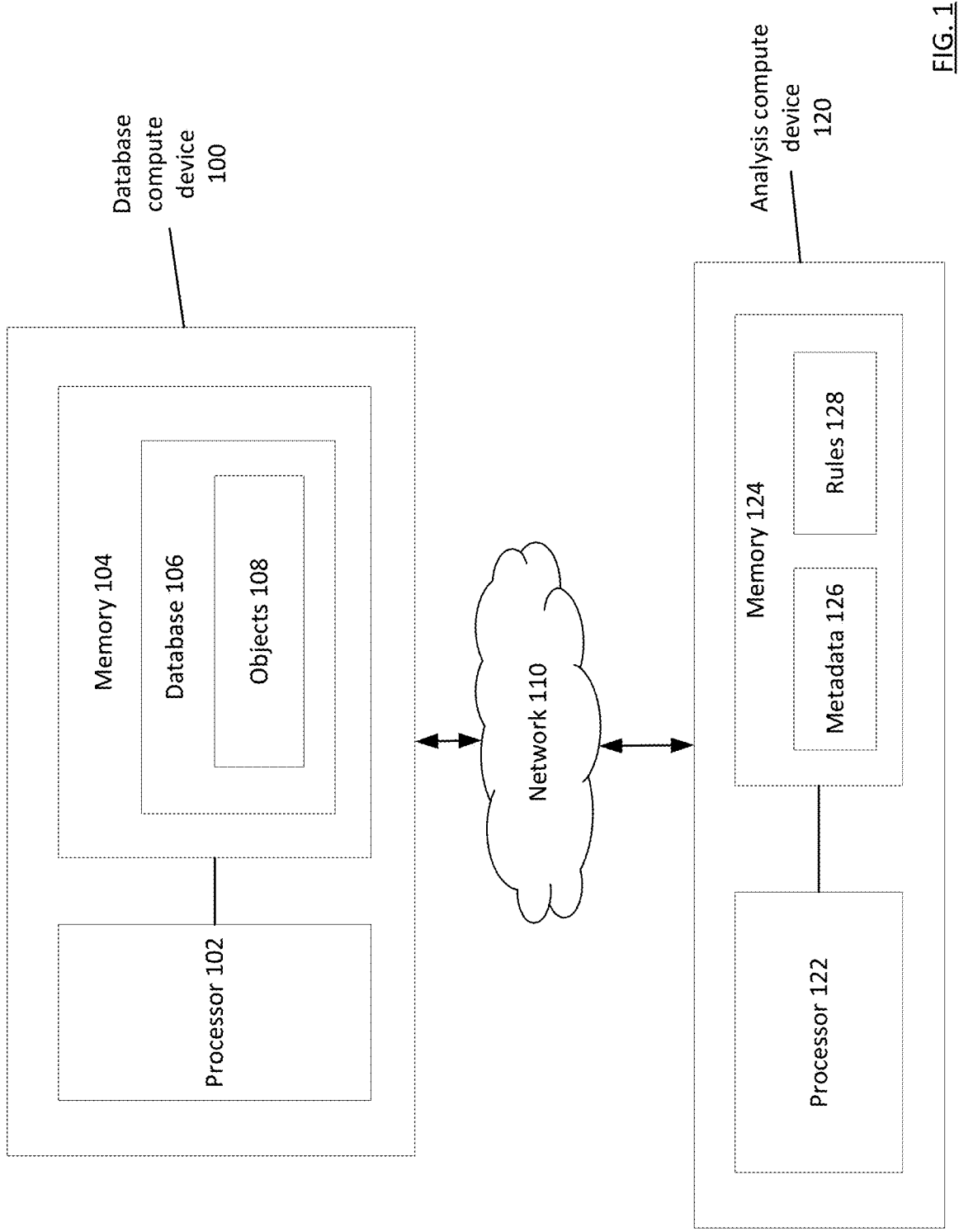

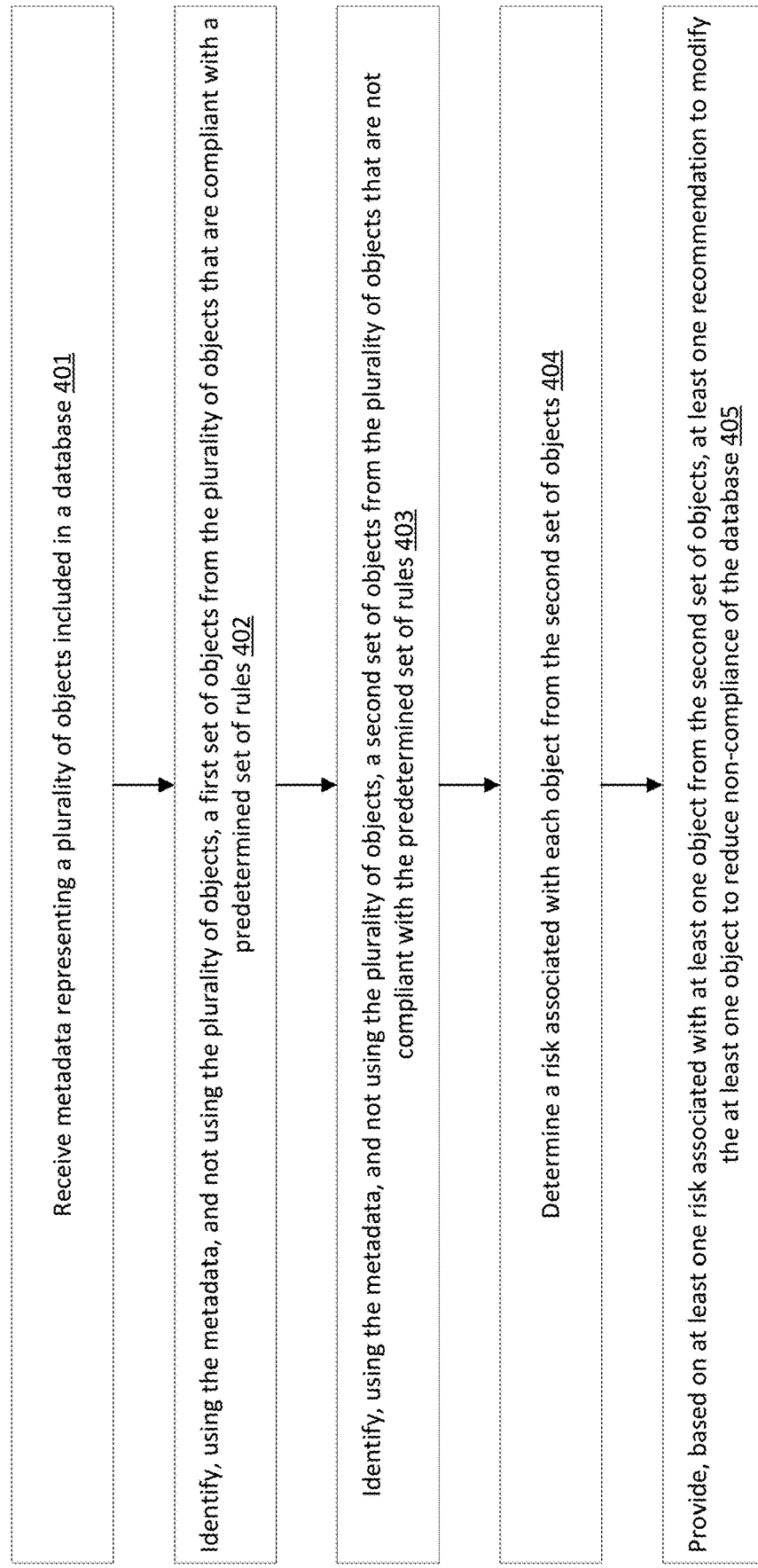

500

Receive metadata representing a plurality of objects included in a database, the database associated with a first environment and a second environment different than the first environment, the first environment including a first set of objects from the plurality of objects, and the second environment including a second set of objects from the plurality of objects different from the first set of objects 501

↓

Compare, using the metadata, not using the plurality of objects, and for each category from a plurality of categories, the first set of objects to the second set of objects 502

↓

Sending, for each category from the plurality of categories, at least one first signal to cause display of comparison results associated with the comparing of the first set of objects to the second set of objects for that category 503

↓

Cause, to improve an alignment associated with the database, at least one object from at least one of the first set of objects or the second set of objects to be modified based on the comparing of the first set of objects to the second set of objects 504

FIG. 5

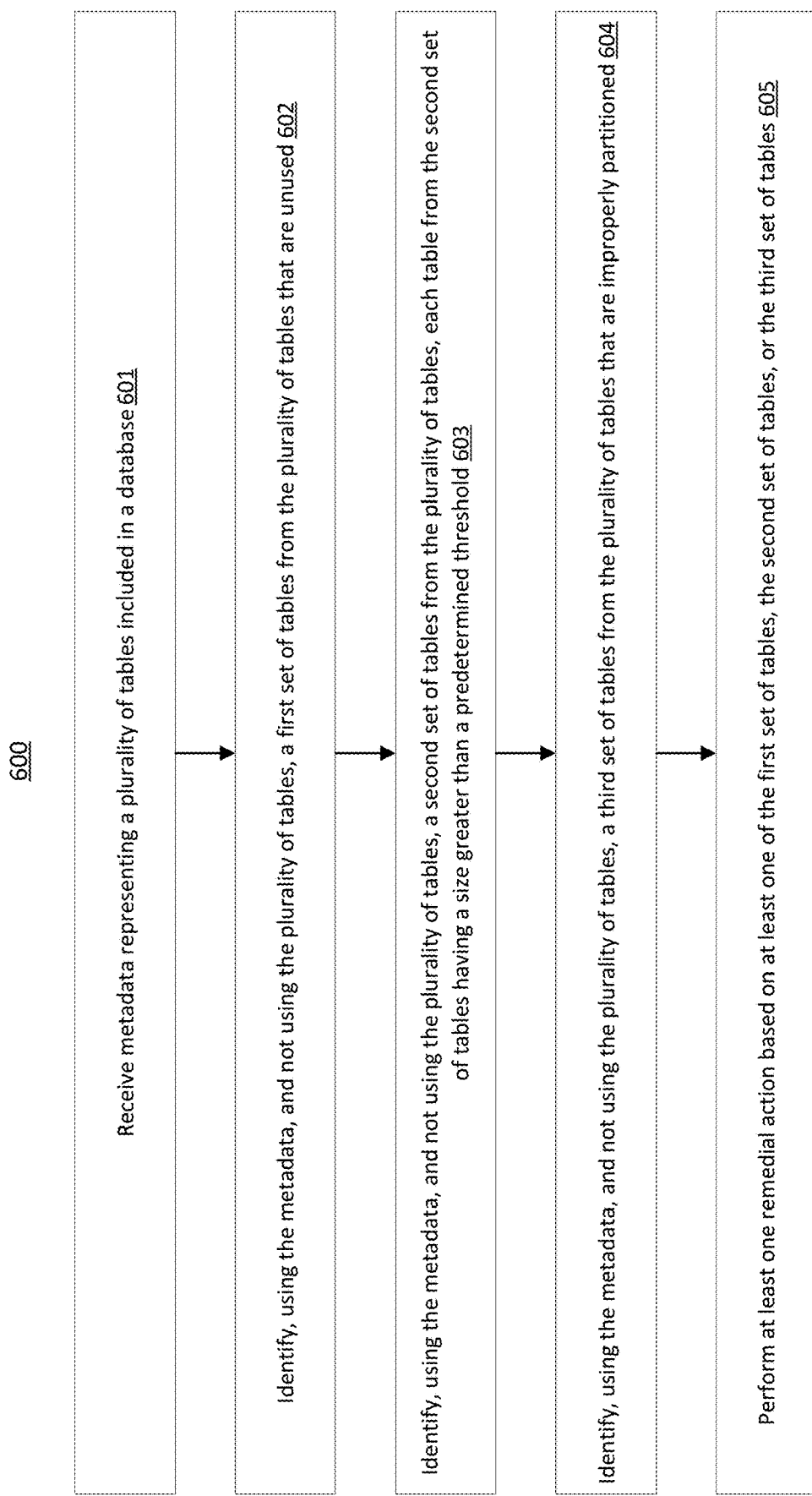

| | | | | | | |
|---|---|---|---|---|---|---|
| CCS.LG | CV_LG_R3_COND | calculationview | NO | HIGH | | |
| CCS.TD.SD.SALES | CV_COSL | calculationview | NO | HIGH | | |
| CCS.TD.SUPPLIER | SUPPLIER_PORTAL_SECURITY_VALIDAT | calculationview | NO | HIGH | | |
| CCS.TD.COVA | CV_COVA_CLSD_ORD | calculationview | NO | HIGH | | |
| CCS.MD.GLACCOUNT | AT_GLACCOUNT | attributeview | NO | HIGH | | |
| CCS.TD.Pricing.Salesforce.Price_Study | CV_SF_CLAIM_ESTIMATION | calculationview | NO | HIGH | | x |
| CCS.TD.LOGISTICS | CV_LOGISTICS_PLAN_ORDER_DATA | calculationview | NO | LOW | | |
| CCS.TD.FSCM | CV_CCT_DTL | calculationview | NO | HIGH | | |
| CCS.TD.SD.SALES | CV_SCHEDULELINE | calculationview | NO | HIGH | | |
| CCS.LG | CV_LG_R1_MAIN_E_WEB1 | calculationview | NO | HIGH | | x |
| CCS.MD.COSTCENTER | AT_COSTCENTER | attributeview | NO | LOW | | |
| CCS.QA.WTY10YR_SPSS_FLOWGRAPH | CV_HEADER_DEALER_DIST_CD_STG_F | calculationview | NO | HIGH | x | |
| CCS.TD.COVA | ZCV_COVA_AUTH_SCRIPT | calculationview | NO | HIGH | | |
| CCS.TD.FREIGHT | CV_FREIGHT_DATA | calculationview | NO | HIGH | | |
| CCS.LG.CT | CV_CT_L1 | calculationview | YES | HIGH | | |
| CCS.TD.D360 | D360_GENERATE_NEW_ROWS | hdbprocedure | YES | | | |
| CCS.MD.MACS | CV_MACSCUSTXREF_OWNER | calculationview | NO | LOW | | |

| Object Type | Package ID | Object Name | Object Suffix |
|---|---|---|---|
| BROKEN | CARRIER_GLOBAL.ME.TD.CRM.ONE_TIM | CV_CRM_PO_DETAILS_N | calculationview |
| BROKEN | CCS.CHGLOG | CV_SCDT_BOOKING | calculationview |
| BROKEN | CCS.TD.CPC | CV_CALL_ONLINE_MERG | calculationview |
| BROKEN | CCS.TD.CPC | CV_CALL_ONLINE_MERG | calculationview |
| BROKEN | CCS.TD.CPC | CV_CALL_ONLINE_MERG | calculationview |
| BROKEN | CCS.TD.CPC | CV_CALL_ONLINE_MERG | calculationview |

APPARATUS AND METHODS FOR MAINTAINING DATA INTEGRITY FOR DATABASE MANAGEMENT

FIELD

One or more embodiments are related to maintaining data integrity for database management.

BACKGROUND

A database (e.g., SAP HANA®) may include objects (i.e., database objects). It can be desirable to maintain the integrity of these objects (e.g., for compliance and/or consistency). At least some objects in the database, however, provide risk. For example, an object can cause issues in the database that can negatively impact performance of the database and/or a compute device associated with and processing data from the database (e.g., slower speed, larger memory burden, etc.).

SUMMARY

In an embodiment, metadata representing a plurality of objects included in a database is received. A first set of objects from the plurality of objects that are compliant with a predetermined set of rules are identified using the metadata and not using the plurality of objects. A second set of objects from the plurality of objects that are not compliant with the predetermined set of rules are identified using the metadata and not using the plurality of objects. A risk associated with each object from the second set of objects is determined. Based on at least one risk associated with at least one object from the second set of objects, at least one recommendation to modify the at least one object to reduce non-compliance of the database is provided.

In an embodiment, metadata representing a plurality of objects included in a database are received. The database is associated with a first environment and a second environment different than the first environment. The first environment includes a first set of objects from the plurality of objects, and the second environment includes a second set of objects from the plurality of objects different from the first set of objects. The first set of objects and the second set of objects are compared using the metadata, not using the plurality of objects, and for each category from a plurality of categories. For each category from the plurality of categories, at least one first signal is sent to cause display of comparison results associated with the comparing of the first set of objects to the second set of objects for that category. At least one object from at least one of the first set of objects or the second set objects is caused to be modified based on the comparing of the first set of objects to the second set of objects and to improve an alignment associated with the database.

In an embodiment, metadata representing a plurality of tables included in a database are received. A first set of tables from the plurality of tables that are unused are identified using the metadata and not using the plurality of tables. A second set of tables from the plurality of tables are identified using the metadata and not using the plurality of tables. Each table from the second set of tables has a size greater than a predetermined threshold. A third set of tables from the plurality of tables that are improperly partitioned are identified using the metadata and not using the plurality of tables. At least one remedial action is performed based on at least one of the first set of tables, the second set of tables, or the third set of tables.

BRIEF DESCRIPTION OF THE DRAWINGS

FIG. 1 shows a block diagram of a system that can analyze objects of a database using a set of rules, according to an embodiment.

FIG. 4 shows a flowchart of a method to reduce non-compliance of a database, according to an embodiment.

FIG. 5 shows a flowchart of a method to improve alignment for a database by comparing objects from different environments of the database, according to an embodiment.

FIG. 6 shows a flowchart of a method to improve alignment for a database by comparing objects from different environments of the database, according to an embodiment.

FIG. 7 shows a screenshot of some metadata, according to an embodiment.

FIG. 8 show screenshots of output that can be produced, according to an embodiment.

DETAILED DESCRIPTION

Figure 2A:
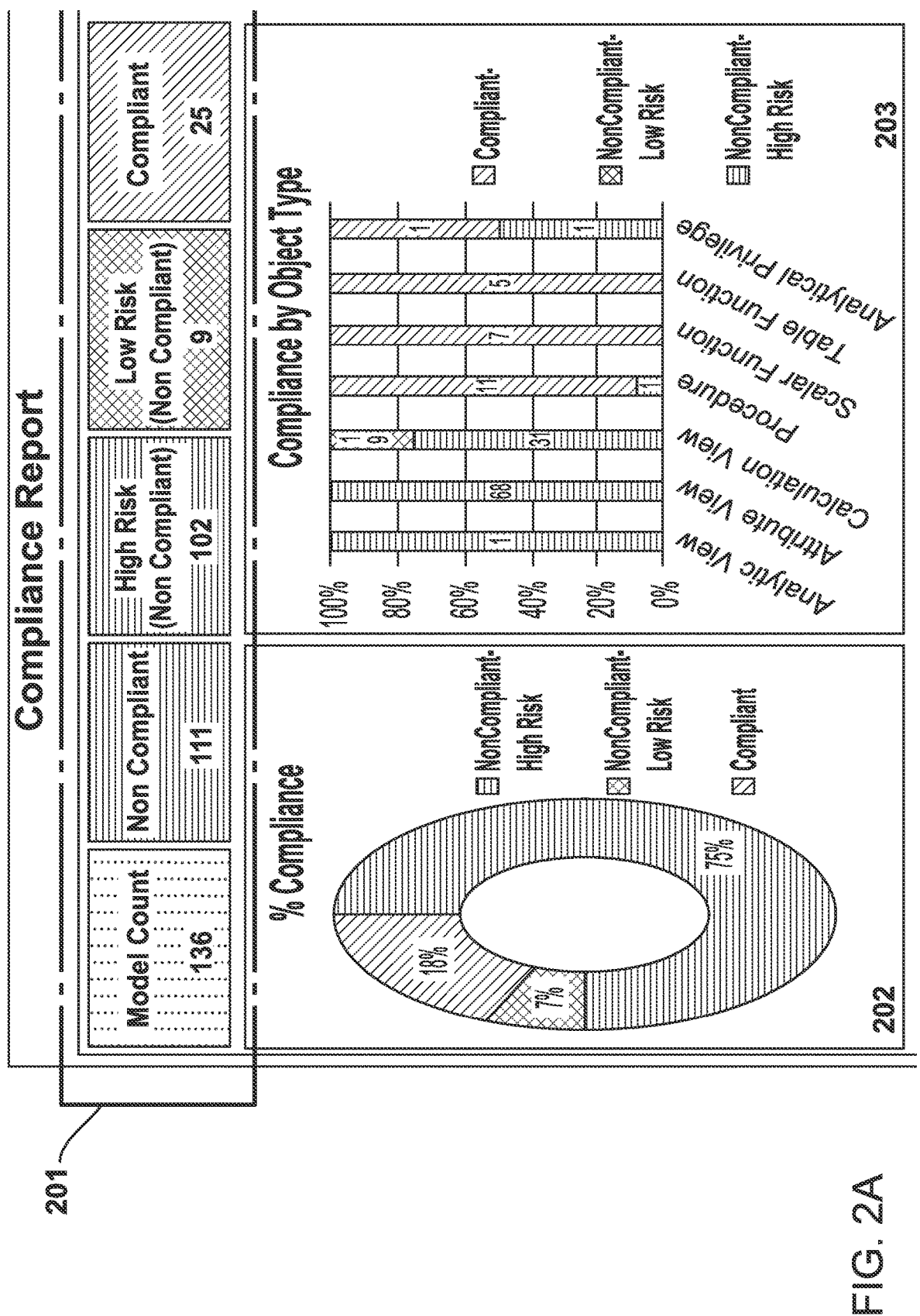
FIGS. 2A-2D show a compliance report, according to an embodiment.

Users of a database, such as SAP HANA®, may use different systems to perform different activities, such as a development system for code development, quality system for testing quality, and a production system for running the business; this is sometimes referred to as a system landscape. Some implementations are related to assessing the consistencies (or inconsistencies) in this system landscape. Such analysis can help users of the database(s) to modify data objects, modify procedures, improve performance of software models, optimize data usage, and/or the like.

Some databases, such as SAP HANA®, are also associated with best practices (e.g., as defined by a user(s)). Some implementations are related to ensuring that the best practices (e.g., defined by SAP®) are followed at a database and/or environment(s) of the database.

Some databases include various objects, such as a view, a table function, a procedure, a table, and/or the like. Some implementations are related to identifying and showcasing compliant and non-compliant objects in a database. In some implementations, compliant objects are objects that have been developed by following a predetermined set of best practices (e.g., the SAP HANA® best practices) (i.e., rules), and can sometimes consume less memory in terms of runtime execution and shorter execution time (e.g., compared to non-compliant objects).

Some implementations are related to identifying poorly built objects in a database (e.g., not following a best practice, too large, too slow, mismatching at different systems of the database, incompatible, etc.). Some implementations are related to a table consistency check that involves scanning all the tables available in the database and identifying the unused tables and/or tables larger than a threshold size. Some implementations are related to identifying tables that are not partitioned properly, partitioning the tables identified as not properly partitioned, and/or causing the tables identified as not properly partitioned to be partitioned. Some implementations are related to an object consistency check that involves scanning all the objects included in the database and identifying the objects that are inconsistent (e.g., for size, quantity, or any other characteristic).

Some implementations are related to identifying objects that are outliers and/or suggesting remediations (e.g., as per the best practices). For example, an object may be an outlier by being much larger than other objects and/or much smaller than other objects. A remediation may be, for example, partitioning a table that is larger than recommended by a best practice, or combining tables that are smaller than recommended by a best practice.

Some implementations are related to performing root cause analysis on objects (e.g., to determine why an object is not working, an outlier, performing sub-standard, and/or the like). In some implementations, root cause analysis is performed by analyzing each object (e.g., reading the XML code of each object) for the development properties of the objects to understand how that object is being designed. If the design deviates from predetermined conditions (e.g., deviating from baseline), then those objects can be marked as non-compliant.

Some implementations are related to migration activities from one environment to another environment. For example, when moving from HANA studio application to HANA XS Advance environment, some implementations help to bring out the list of Attribute views, Analytical Views, Script based views, and/or the like that are to be migrated to calculation view type as a prerequisite.

Some implementations are related to system performance. For example, unused and/or large size tables (which might affect the system performance if they are not being handled effectively) can be identified, and remediation actions can occur. This can provide a technical improvement/advantage in a database and/or a compute device. For example, a database has been transformed such that the database can be smaller and/or parsed faster. As another example, a compute device can analyze a database faster and/or using less memory if storing the database (thereby saving memory).

Some implementations are related to monitoring activities. For example, a user (e.g., solution architect, developer, analyst, etc.) can monitor how many compliant and non-complaint objects are used in a database and/or system(s) of the database, and take a remediation action if desired by the user.

Some implementations are related to system alignments. For example, an object in one system of the database that has become undesirably modified in another system of the database can be identified.

In many instances, the use and/or need of development objects can increase, which in turn can increase the number of objects in a database. In some instances, the number of objects can be so large that analyzing all the objects to identify erroneous or broken objects is essentially impossible for a human(s) (e.g., manually).

In some known tools, like SAP Standard tool, Plan viz or Explain plan may only be performed on testing the calculation views, whereas other HANA objects like Table Functions, Procedures, Tables cannot be tested by these tools. This might create an undesirable performance impact on those untestable objects if they were not developed by following the SAP® best practices. Therefore, some implementations discussed herein are related to analyzing all and/or most major HANA objects (or at least more objects than known systems), such as Table Functions, Procedures, Tables, and/or the like. Additionally, some implementations can perform checks for objects faster than known tools (e.g., the standard tool provided by SAP®) by analyzing metadata of the object without analyzing the entire object itself. Some implementations are related to compiling objects and identifying the list of broken objects (e.g., broken models), categorizing broken objects (e.g., whether they are low risk or high risk for the system), and/or providing remediation actions (e.g., in line with best practices) for the low and/or high risk objects.

In some implementations, the identifying of broken objects, categorizing of risk, and/or providing of remediation actions is done automatically and without human intervention; this can save, for example, time and resources. In some implementations, the identifying of broken objects, categorizing of risk, and/or providing of remediation actions can include human intervention.

In some implementations, prior to determining whether or not objects are broken, their associated risk, and remediation actions, a set of rules are created/defined, where the determining of whether or not objects are brokens, their associated risk, and remediation actions are made based upon the set of rules. The set of rules can be defined based on, for example, best practices provided by a user (e.g., SAP HANA® best practices) and/or custom selections/inputs. In some implementations, the set of rules can be associated with (e.g., defined using, represented by) tables. For example, a table (e.g., look-up table) can be created to hold the configuration values for the packages to be evaluated, threshold for unpartitioned table size, the threshold percentage of average table partition size, and/or the like. As another example, a table can be created to capture/represent a compliance checklist and/or corresponding risk category.

In some implementations, compliance check report materialization (using the set of rules) can be logged. In some instances, representations of the compliance check can be displayed, such as the number of compliant and/or non-compliant objects, risks associated with the compliant and/or non-compliant objects, or any other relevant attributes that can be determined based on a compliance check.

FIG. 1 shows a block diagram of a system that can analyze objects of a database using a set of rules, according to an embodiment. FIG. 1 includes a database compute device 100 communicably coupled to an analysis compute device 120 via a network 110.

The network 110 can be any suitable communications network for transferring data, operating over public and/or private networks. For example, the network 110 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 110 can be a wireless network such as, for example, a Wi-Fi or wireless local area network ("WLAN"), a wireless wide area network ("WWAN"), and/or a cellular network. In other instances, the network 110 can be a wired network such as, for example, an Ethernet network, a digital subscription line ("DSL") network, a broadband network, and/or a fiber-optic network. In some instances, the network 110 can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via the network 110 can be encrypted or unencrypted. In some instances, the network 110 can include multiple networks or subnetworks operatively coupled to one another by, for example, network bridges, routers, switches, gateways and/or the like.

The database compute device 100 can include a processor 102 communicable coupled to a memory 104 (e.g., via a system bus). The database compute device 100 can be any type of compute device, such as a desktop, laptop, server, internet of things device, edge device, tablet, phone, and/or the like.

The processor 102 can be, for example, a hardware-based integrated circuit (IC) or any other suitable processing device configured to run and/or execute a set of instructions or code. For example, the processor 102 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 102 can be configured to run any of the methods and/or portions of methods discussed herein.

The memory 104 can be, for example, a random-access memory (RAM), a memory buffer, a hard drive, a read-only memory (ROM), an erasable programmable read-only memory (EPROM), and/or the like. The memory 104 can be configured to store any data used by the processor 102 to perform the techniques discussed herein. In some instances, the memory 104 can store, for example, one or more software programs and/or code that can include instructions to cause the processor 102 to perform one or more processes, functions, and/or the like. In some implementations, the memory 104 can include extendible storage units that can be added and used incrementally. In some implementations, the memory 104 can be a portable memory (for example, a flash drive, a portable hard disk, and/or the like) that can be operatively coupled to the processor 102. In some instances, the memory 104 can be remotely operatively coupled with a compute device (not shown in FIG. 1).

The memory 104 can include (e.g., store) a representation of a database 106. In some implementations, the database 106 is a relational database. In some implementations, the database 106 is an in-memory, column-oriented, relational database, such as an SAP HANA® database. The database 106 can be associated with (e.g., hold, include) data. For example, the database 106 can hold data used by an organization, such as a company. The database 106 can store data associated with multiple environments, such as test environment, a development environment, a production environment, a quality assurance environment, and/or the like.

The database 106 can also include a representation of objects 108. The objects 108 can refers to artifacts used in the database 106. For example, the objects 108 can include server instances, schemas, tables, virtual tables, views, packages, attribute views, analytic views, calculation views, and/or the like. In some implementations, an "object" refers to a data structure that can store and/or reference data. Objects 108 can include objects from multiple environments, such as test environment, a development environment, a production environment, a quality assurance environment, and/or the like. Each object from objects 108 can be associated with metadata (e.g., relational database metadata). Examples of metadata include tables, columns, data types, constraints, table relationships, sessions, connection history, query history, size, number of rows and/or columns, names, last accessed, users, privileges, triggers, and/or the like. In some implementations, the metadata is identified, aggregated, and/or stored locally (e.g., in memory 104). In some implementations, the objects 108 include representation of confidential and/or client specific data.

The analysis compute device 120 can include a processor 122 communicable coupled to a memory 124 (e.g., via a system bus). The analysis compute device 120 can be any type of compute device, such as a desktop, laptop, server, internet of things device, edge device, tablet, phone, and/or the like.

The processor 122 can be, for example, a hardware-based integrated circuit (IC) or any other suitable processing device configured to run and/or execute a set of instructions or code. For example, the processor 122 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 122 can be configured to run any of the methods and/or portions of methods discussed herein.

The memory 124 can be, for example, a random-access memory (RAM), a memory buffer, a hard drive, a read-only memory (ROM), an erasable programmable read-only memory (EPROM), and/or the like. The memory 124 can be configured to store any data used by the processor 122 to perform the techniques discussed herein. In some instances, the memory 124 can store, for example, one or more software programs and/or code that can include instructions to cause the processor 122 to perform one or more processes, functions, and/or the like. In some implementations, the memory 124 can include extendible storage units that can be added and used incrementally. In some implementations, the memory 124 can be a portable memory (for example, a flash drive, a portable hard disk, and/or the like) that can be operatively coupled to the processor 122. In some instances, the memory 124 can be remotely operatively coupled with a compute device (not shown in FIG. 1).

The memory 124 includes (e.g., store) a representation of metadata 126. The metadata 126 can be metadata associated with objects 108. For example, metadata 126 can refer to tables, columns, data types, constraints, table relationships, sessions, connection history, query history, size, number of rows and/or columns, names, last accessed, users, privileges, triggers, and/or the like that are associated with objects 108.

In some implementations, the metadata 126 is aggregated (or extracted or defined) at database compute device 100 using objects 108, and sent to the analysis compute device 120. In some instances, analysis compute device 120 receives the metadata 126 from database compute device 100, but not objects 108. Receiving metadata 126, but not objects 108, can reduce the amount of data that is to be transferred from database compute device 100 to analysis compute device 120; this can help to protect client specific and/or confidential information, and reduce the amount of data that is to be shared between database compute device 100 and analysis compute device 120 (compared to a situation where objects 108 are sent from database compute device 100 to analysis compute device 120). In some implementations, the objects 108 are sent from database compute device 100 to analysis compute device 120, and analysis compute device 120 obtains the metadata 126 from the objects 108. In some implementations, a user has access to analysis compute device 120, but not database compute device 100; such user can view/request analytics associated with objects 108 without having full access to objects 108.

The memory 120 can also include (e.g., store) a representation of rules 128. The rules 128 can refer to rules that are to be compared against the metadata 126 (e.g., to determine compliance, non-compliance, risk, consistency across environments, remediation actions, and/or the like). The rules 128 may be based on best practices associated with the database 106, such as best practices provided by a designer of the database 106, an authorized affiliate associated with the database 106, a third party, and/or the like. Examples of rules 128 include rules based on size, number of rows, number of columns, data types, partitioning characteristics, constraints, table relationships, session characteristics, time of usage, time of deletion, time of modification, query history, name of object, users using, privileges, triggers, and/or the like. In some implementations, the rules 128 can be associated with (e.g., included in, represented using, etc.) a table, such as a look-up table.

The analysis compute device 120 can use the metadata 126 and rules 128 to determined predict characteristics associated with the objects 108. The characteristics can include determinations of various attributes associated with an object(s). Additional details are discussed with respect to FIGS. 2 and 3.

In some implementations, the rules 128 include rules indicating, for a given object, rules that the object follows to be compliant and/or rules that the object follows to be non-compliant. In some implementations, different objects may be associated with different rules. For example, one rule in rules 128 can indicate a threshold number of rows and/or columns that a table object can have to be compliant, while another rule in rules 128 can indicate the maximum size that a package can be to be compliant.

In some implementations, the rules 128 include rules indicating, for a given object, rules to determine how non-compliant (and/or compliant) that object is. For example, the rules 128 can be used to determine the amount of risk posed by a given object. One object may have high risk, for example, while another object may have low risk. For instance, where a rule indicates that a table should have less than 10 rows, a table having 30 rows may be considered higher risk than a table having 12 rows.

In some implementations, the rules 128 can include rules indicating how objects from one environment (e.g., test environment) should compare to objects from another environment (e.g., development environment). The comparison can be based on one or more categories, such as a schema count, a table count, a procedure count, a trigger count, a synonym count, a downward flow count, an upward flow count, a package count, an object count, an object type, and/or the like. For example, a rule can indicate that the trigger count of an object in one environment should be larger than the trigger count of that object in another environment. As another example, a rule can indicate that the number of packages in one environment should be the same as the number of packages in another environment.

In some implementations, the rules 128 can include rules indicating remediation actions to take place. For example, a rule can indicate, for a given object and based on the compliance, risk, and/or comparison of the object, a remediation action that is associated with the given object. For example, one remediation action (e.g., delete table) may be associated with non-compliant tables having high risk, a different remediation action (e.g., flag table) may be associated with non-compliant tables having low risk, and yet a different remediation action may be associated with non-compliant packages having high or low risk. As another example, a rule can indicate a remediation action that is to take place based on comparisons of an object(s) at different environments. For instance, if the number of objects has increased from one environment to another (e.g., by 1%, by 5%, by 10%, by 25%, etc.), the new objects created from the former environment to the latter environment can be identified, flagged, and/or deleted. In some implementations, for non-compliant objects, a remediation action includes modifying the metadata for the non-compliant objects.

FIGS. 2A-2D and 3A-3F display examples of various outputs from an analysis, which can be displayed via a graphical user interface in some instances. A set of data that is to be analyzed (e.g., objects 108 and/or database 106) may sometimes be associated with a massive amount of data (e.g., thousands of objects, millions of transactions, and/or the like). As will be shown and discussed with respect to FIGS. 2A-2D and 3A-3F, one or more implementations recite improvements over known systems, resulting in an improved user interface for compute devices (e.g., database compute device 100, analysis compute device 120, and/or a compute device not shown in FIG. 1). For example, some implementations are related to presenting a limited amount of information determined based on the set of data to be analyzed. Some implementations are related to determining and/or causing display of the limited set of information (e.g., number of compliant objects, risk of non-compliant objects, comparisons of objects at different environments, etc.). Such limited set of information can be advantageous in some cases. For example, a user may not be able to view the entire set of data to be analyzed using a compute device with a smaller screen, lesser processing power, lesser memory, and/or the like, but may be able to view the limited set of information using that compute device. As such, a user's efficiency and the compute device's efficiency can be improved (e.g., in analyzing the set of data to be analyzed).

FIGS. 2A-2D show a compliance report, according to an embodiment. The compliance report can be used to represent analytics associated with objects of a database(s). In some implementations, the information shown in FIGS. 2A-2D can be determined by the analysis compute device 120. In some implementations, FIGS. 2A-2D are an example of an output that can be caused to display (e.g., at analysis compute device 120, at database compute device 100, at a compute device not shown in FIG. 1) by the analysis compute device 120.

Figure 2B:
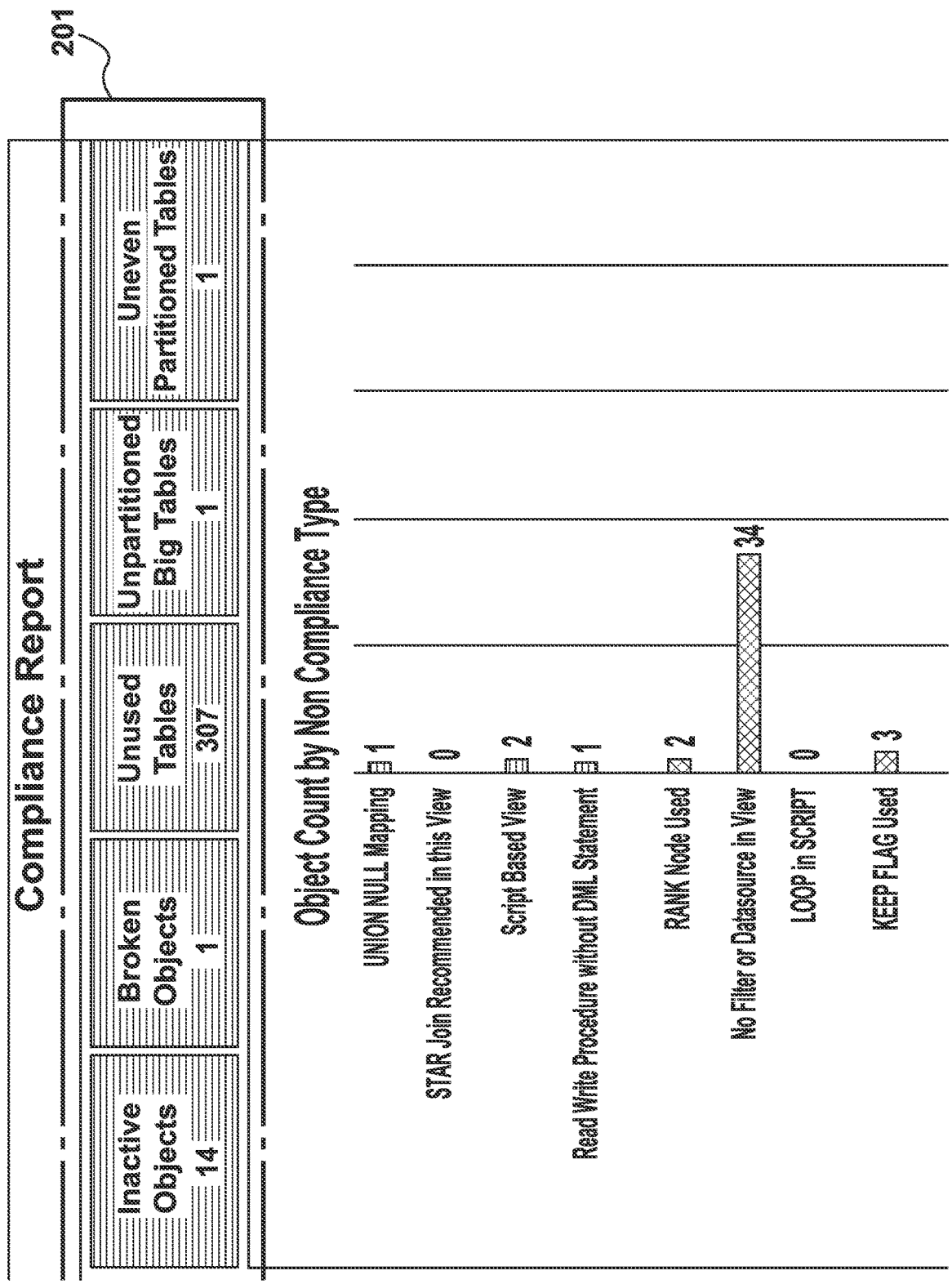

Portion 201 of FIGS. 2A-2B includes an indication of model count. The model count indicates that a database (e.g., database 106) includes 136 objects (e.g., objects 108). Portion 201 also includes an indication that, of the 136 objects, 111 are non-compliant. Of the 111 non-compliant objects, 102 are of high risk, and 9 are of low risk. Portion 201 also includes an indication that 25 of the objects are compliant. Portion 201 also includes an indication that 14 objects are inactive, 1 object is broken, 307 tables are unused, 1 big table is unpartitioned, and 1 table is unevenly partitioned. In some implementations, an inactive object refers to an object that has not been used for a period of time greater than a predetermined threshold. In some implementations, a broken object refers to an object that does not work properly (or is not accessible properly). In some implementations, an unused table refers to a table that doesn't include any additional data and/or has not been used for a period of time greater than a predetermined threshold. In some implementations, a big table refers to a table having a number of rows and/or columns greater than a predetermined threshold (e.g., more than 10 rows or columns, more than 20 row or columns, more than 100 rows or columns, more than 500 rows or columns, more than 10,000 rows or columns, and/or the like).

Portion 202 of FIG. 2A includes indication of the proportion of objects that are non-compliant high risk, the proportion of objects that are non-compliant low risk, and the proportion of objects that are compliant, according to an embodiment. Each of the objects can be associated with an object type. Portion 203 includes indications of the number of compliant, non-compliant low risk, and/or non-compliant high risk objects for a given object type. The vertical axis of the graph in portion 203 is a percentage value between 0-100, and the horizontal axis of the graph in portion 203 lists various object types. Portion 203 shows that: object type analytic view has 1 non-compliant high risk object; object type attribute view has 68 non-compliant high risk objects; object type calculation view has 31 non-compliant high risk objects and 19 non-compliant low risk objects; object type procedure has 1 non-compliant high risk object and 11 compliant objects; object type scalar function has 7 compliant objects; object type table function has 5 compliant objects; and object type analytic privilege has 1 non-compliant high risk object and 1 compliant object.

Figure 2C:
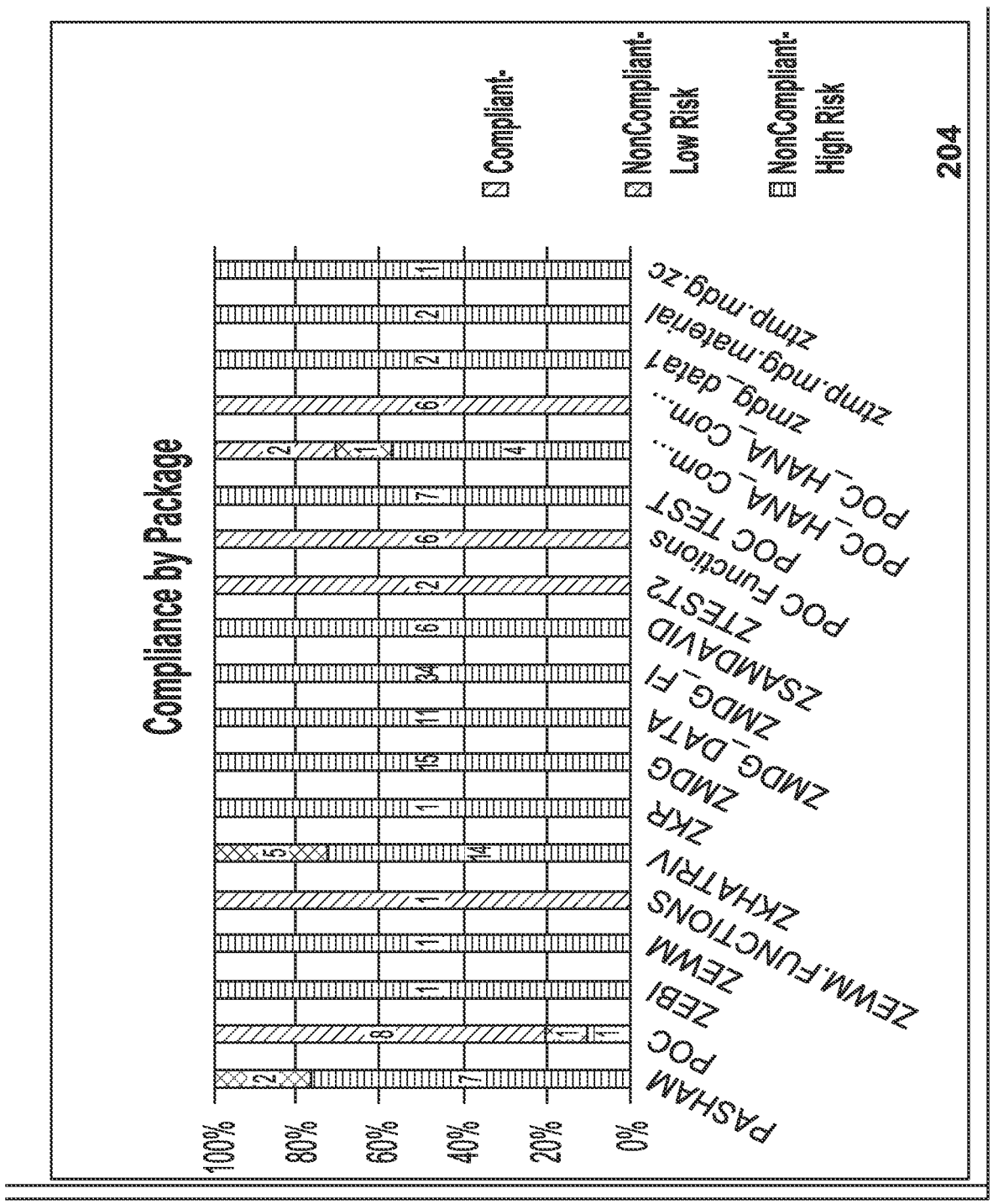

Portion 204 of FIG. 2C includes indications of the number of objects that are compliant, non-compliant low risk, and/or non-compliant high risk objects for a given package (where a package can be a type of object), according to an embodiment. The vertical axis of the graph in portion 204 is a percentage value between 0-100, and the horizontal axis of the graph in portion 204 lists various packages. Portion 204 shows that: package PASHAM has 7 non-compliant high risk objects and 2 non-compliant low risk objects; package POC has 1 non-compliant high risk object, 1 non-compliant low risk object, and 8 compliant objects; package ZEBI has 2 non-compliant high risk objects; package ZEWM has 1 non-compliant high risk object; package ZEWM.FUNCTIONS has 1 compliant object; packageZKHA TRIV has 14 non-compliant high risk objects and 5 non-compliant low risk objects; package ZKR has 1 non-compliant high risk object; package ZMDG has 15 non-compliant high risk objects; packageZMDG_DATA has 11 non-compliant high risk objects; package ZMDG_FI has 34 non-compliant high risk objects; package ZSAMDAVID has 6 non-compliant high risk objects; package ZTESTZ has 2 compliant objects; package POC Functions has 6 compliant objects; package POC TEST has 1 non-compliant high risk object; package POC_HANA_Com . . . has 4 non-compliant high risk objects, 1 non-compliant low risk object, and 2 compliant objects; package POC_HANA_Com . . . has 6 compliant objects; package zmdg_data1 has 2 non-compliant high risk objects; package ztmp.mdg.material has 2 non-compliant high risk objects; and package ztmp.mdg.zc has 1 non-compliant high risk object.

Figure 2D:
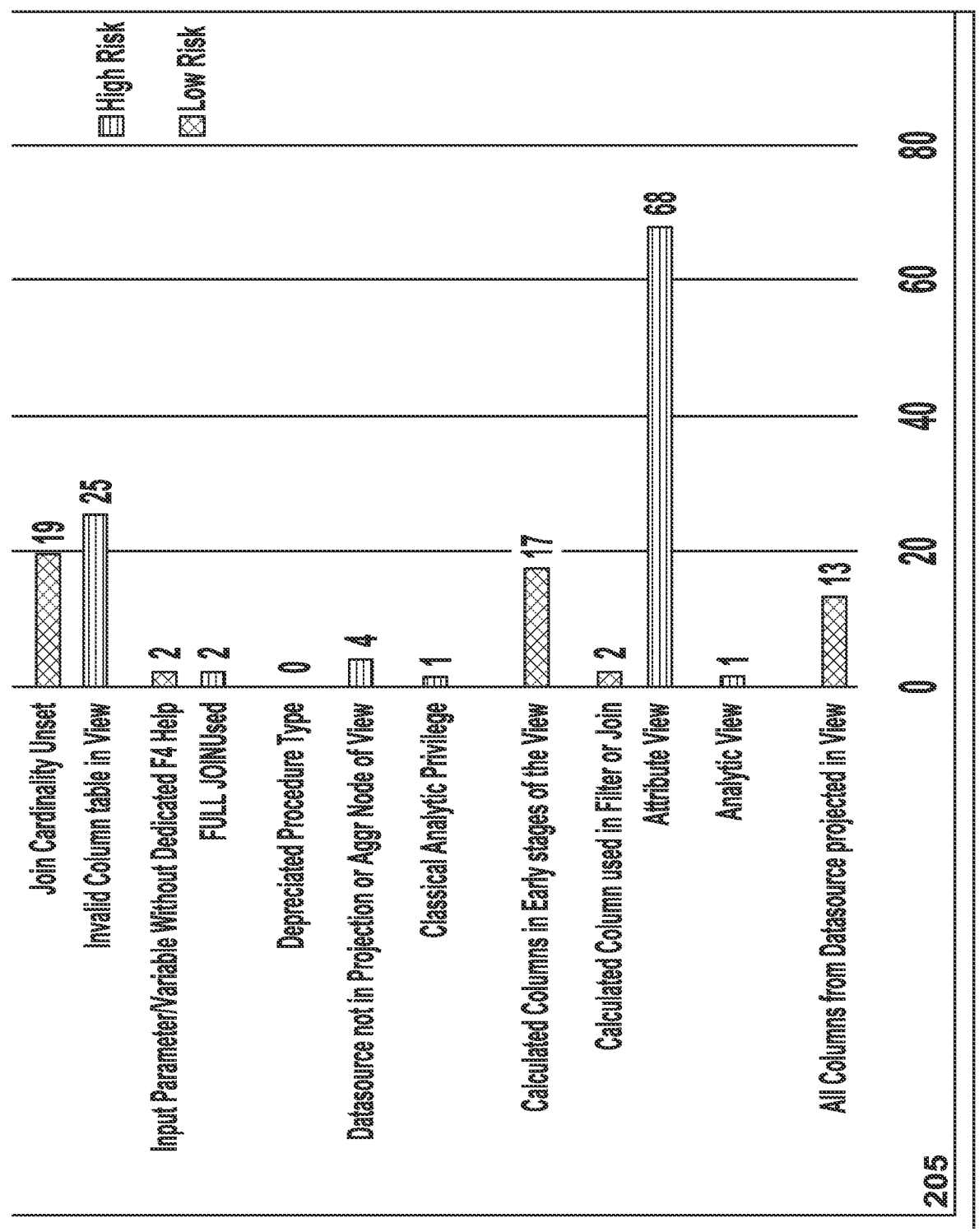

Portion 205 of FIGS. 2B and 2D includes indications of object count by non-compliance type, according to an embodiment. The vertical axis of the graph in portion 205 is lists various non-compliance types, and the horizontal axis of the graph in portion 205 indicates frequency/count. Portion 205 shows that: UNION NULL Mapping has 1 object (high risk); STAR Join Recommended in this View has 0 objects; Script Based View has 2 objects (high risk); Read-Write Procedure without DML Statement has 1 object (high risk); RANK Node Used has 2 objects (low risk); No Filter on Datasource in View has 34 objects (low risk); LOOP in SCRIPT has 0 objects; KEEP FLAG Used has 3 objects (low risk); Join Cardinality Unset has 19 objects (low risk); InvalidColumn Table in view has 25 objects (high risk); Input Parameter/Variable Without DedicatedF4Help has 2 objects (low risk); FULL JOIN Used has 2 objects (low risk); Depreciated Procedure Type has 0 objects; Datasource not in Projection or Aggr Node of View has 4 objects (high risk); Classical Analytic Privilege has 1 object (high risk); CalculatedColumns in Early stages of the View has 17 objects (low risk); Calculated Column used in Filter or Join has 2 objects (low risk); Attribute View has 68 objects (high risk); analytic view has 1 object (high risk); and All columns from Datasource project in View has 13 objects (low risk).

FIGS. 3A-3F show a comparison report, according to an embodiment. The comparison report can be used to represent analytics associated with objects across different environments of a database(s). In some implementations, the information shown in FIGS. 3A-3F can be determined by the analysis compute device 120. In some implementations, FIGS. 3A-3F represent an example of an output that can be caused to display (e.g., at analysis compute device 120, at database compute device 100, at a compute device not shown in FIG. 1) by the analysis compute device 120.

Figure 3A:
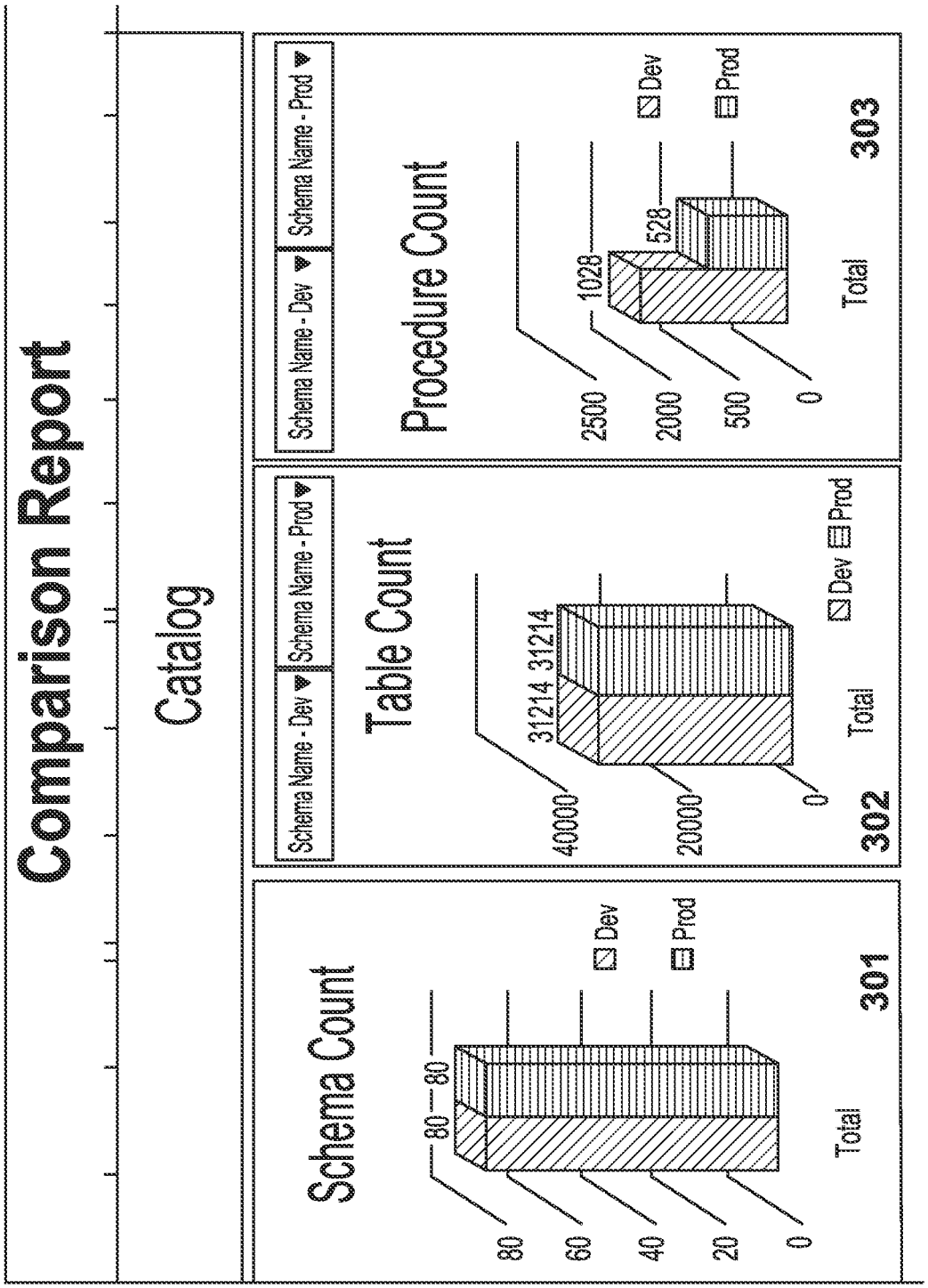
FIGS. 3A-3F show a compliance report, according to an embodiment.
Figure 3B:
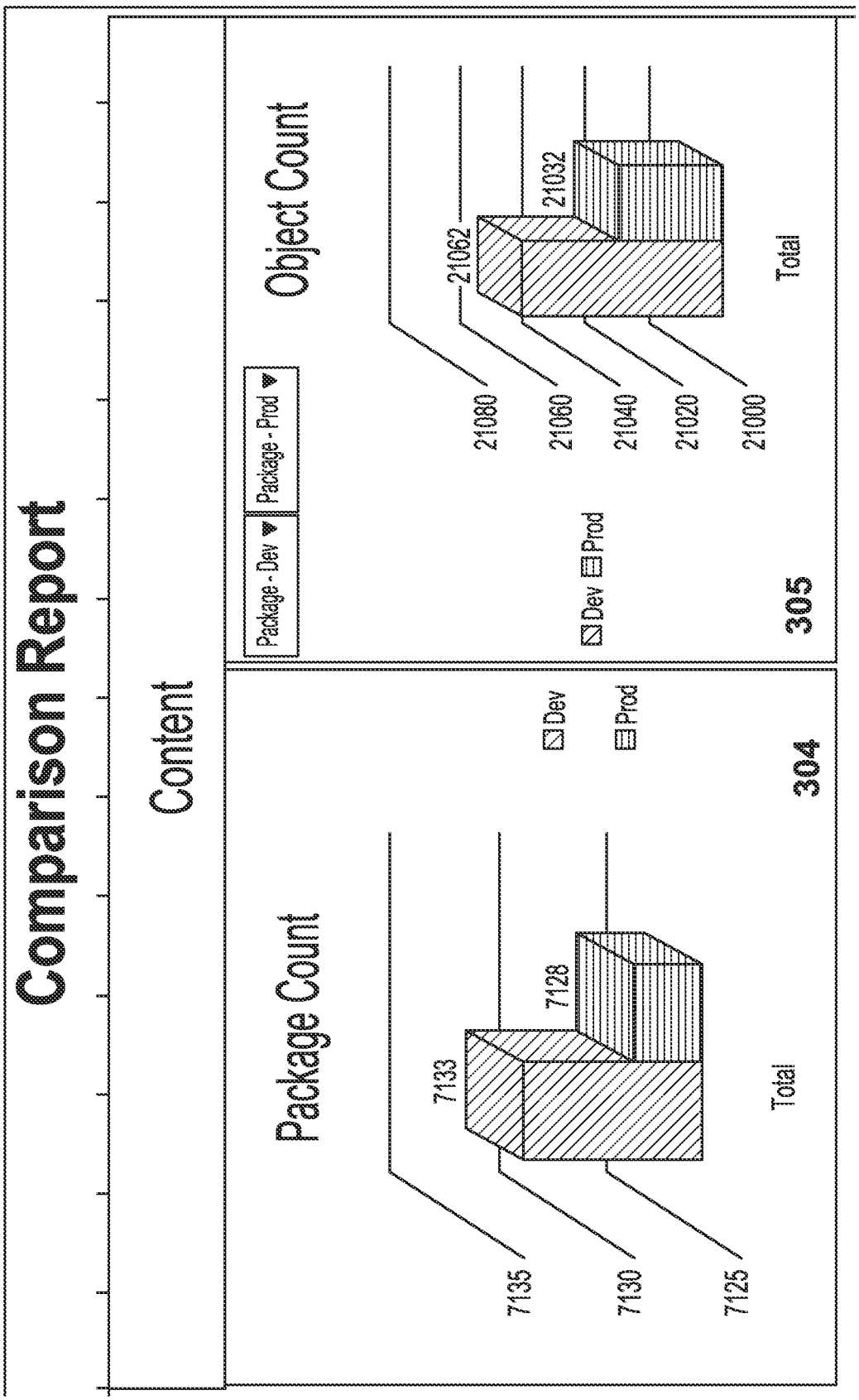
Figure 3C:
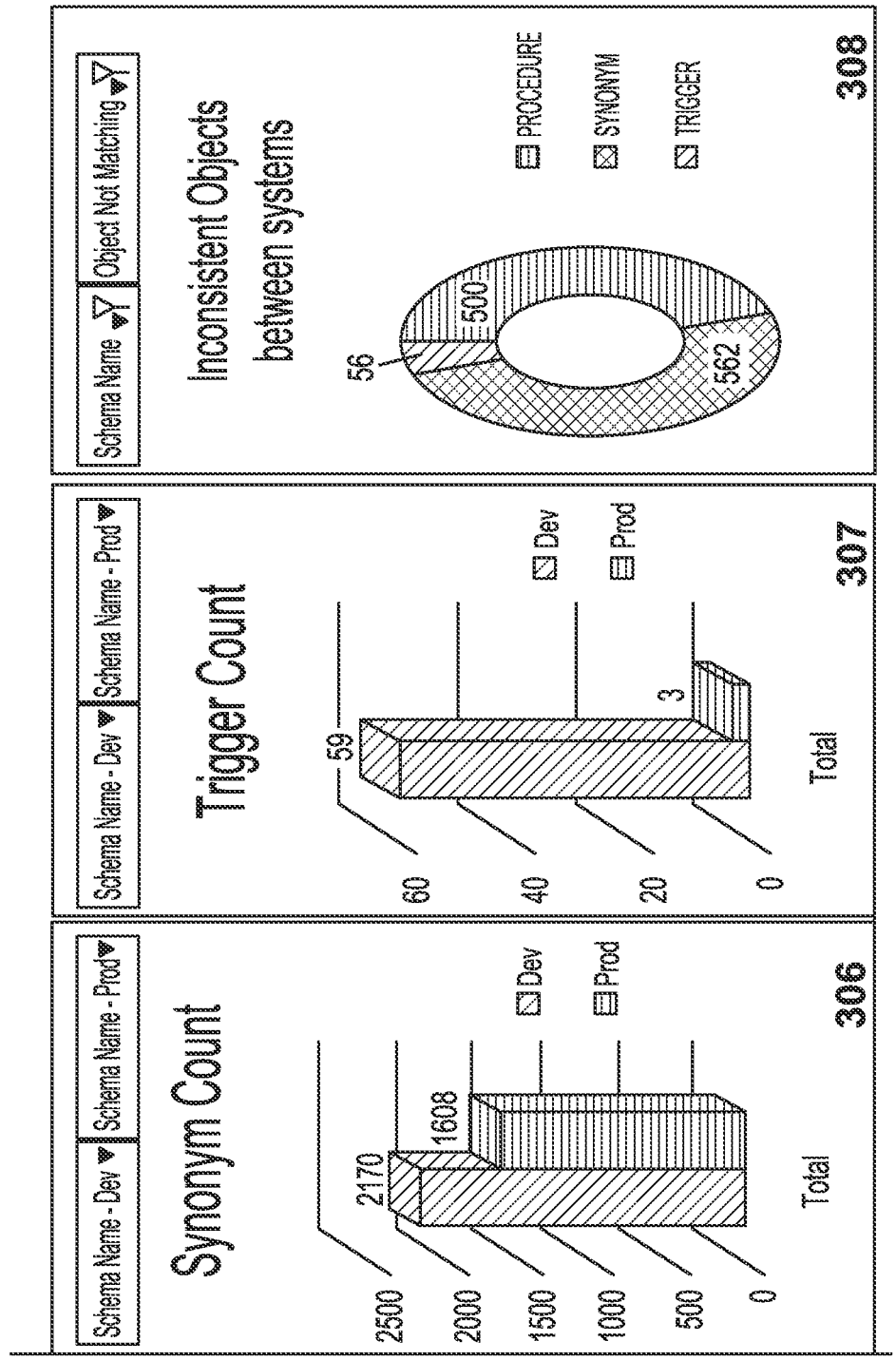
Figure 3D:
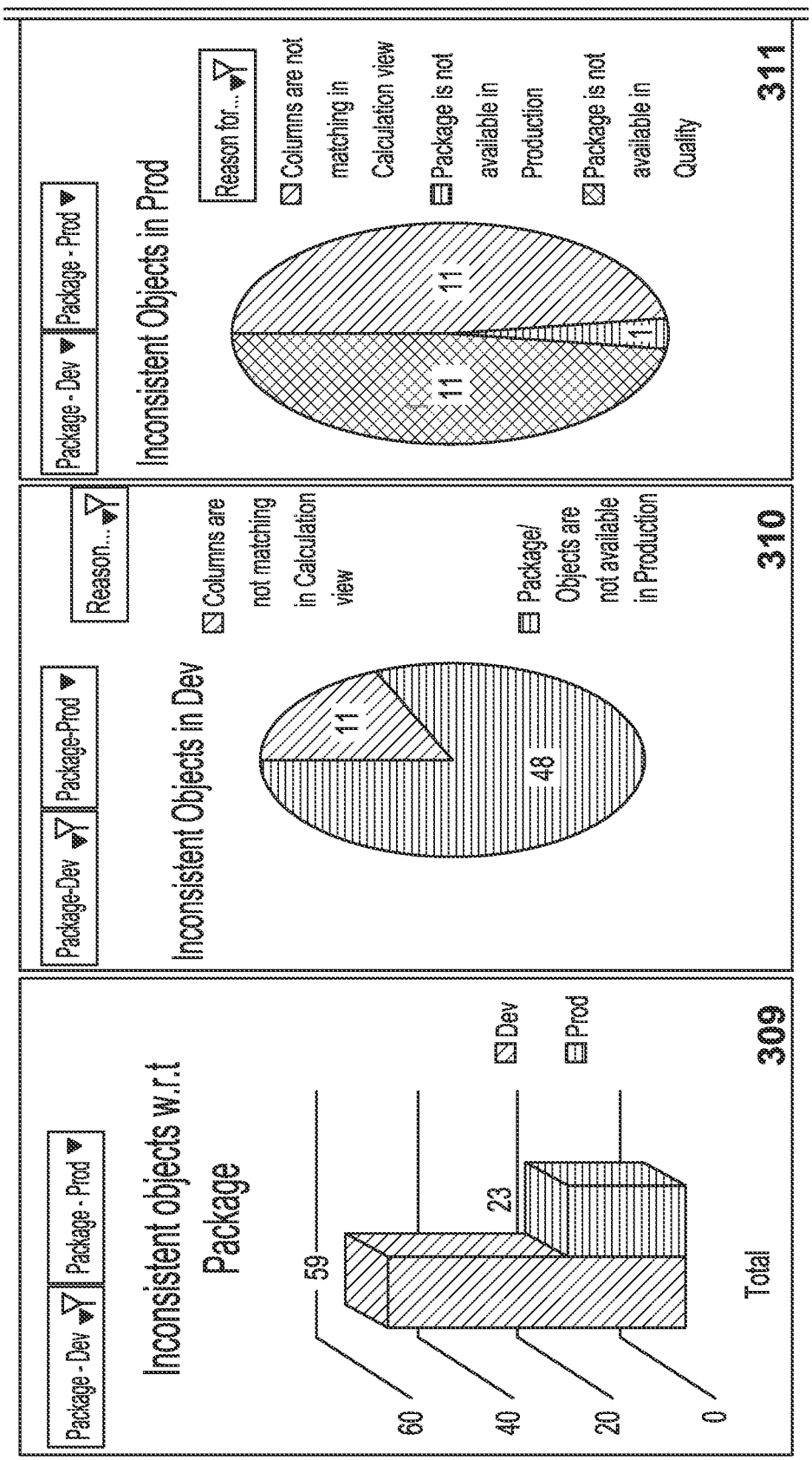
Figure 3E:
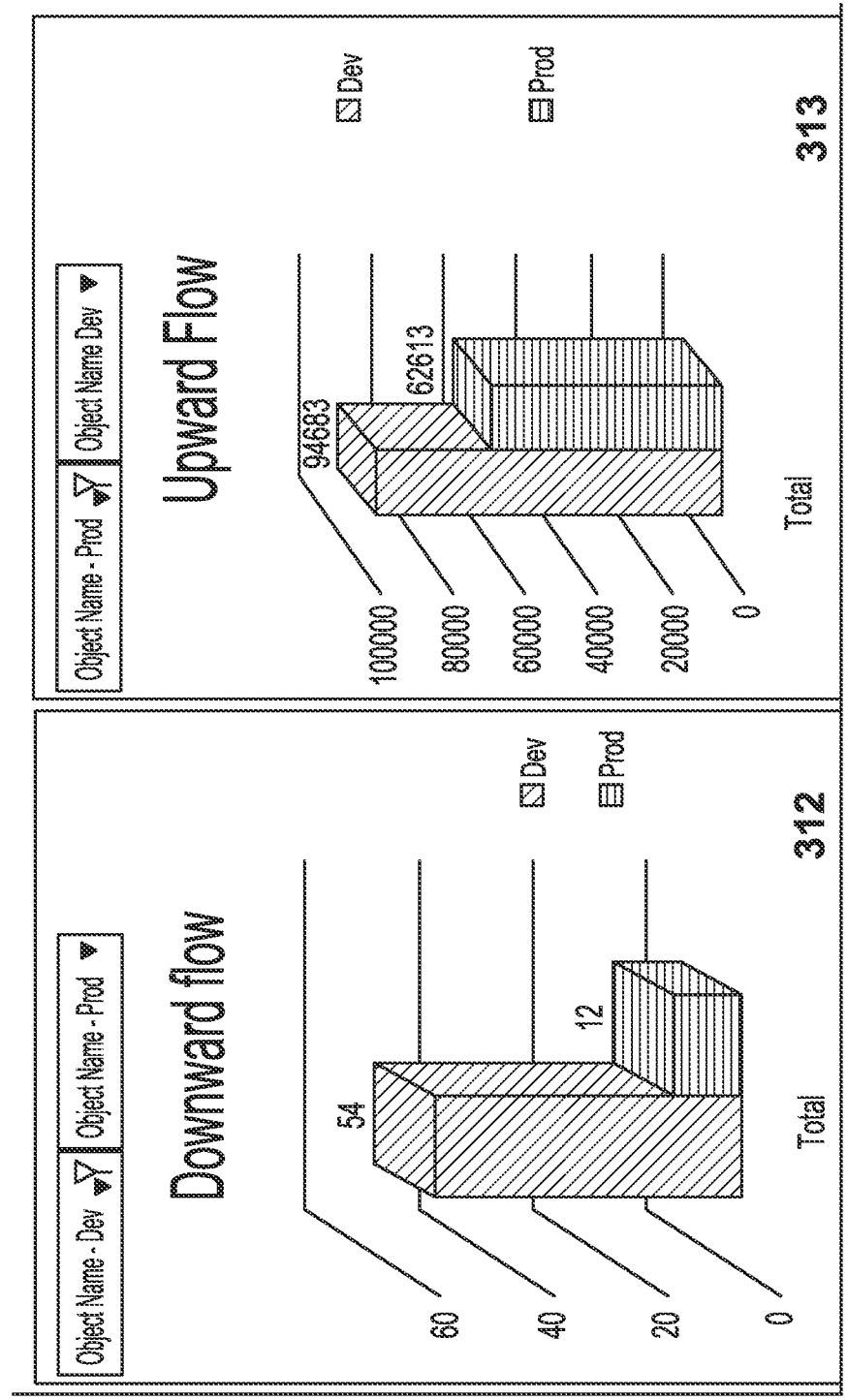
Figure 3F:
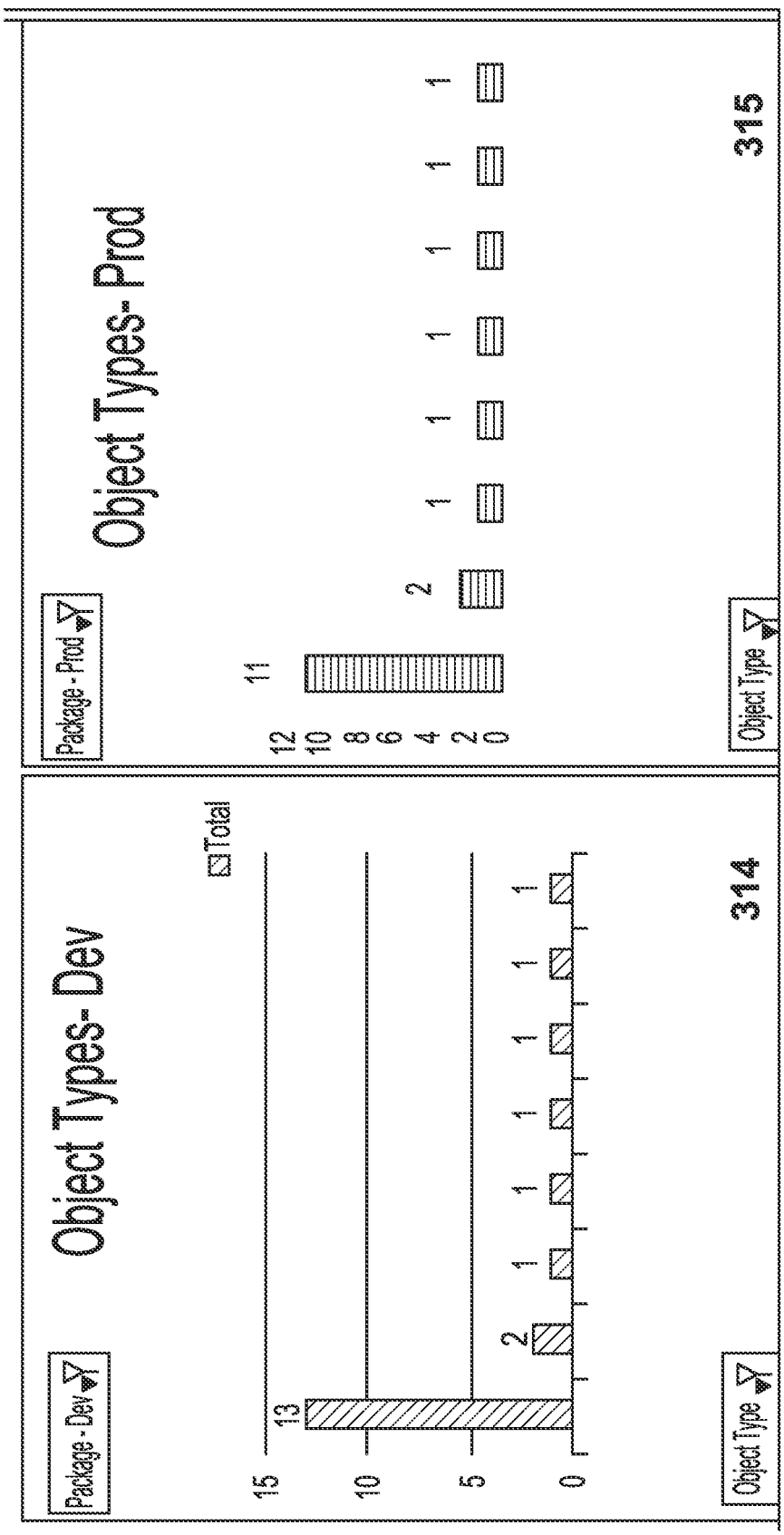

Portion 301 of FIG. 3A indicates that a development environment has 80 schema, and a production environment has 80 schema. Portion 302 of FIG. 3A indicates that the development environment has 31,214 tables, and the production environment has 31,214 tables. Portion 303 of FIG. 3A indicates that the development environment has 1,028 procedures, while the production environment has 528 procedures. Portion 304 of FIG. 3B indicates that the development environment has 7,133 packages, while the production environment has 7,128 packages. Portion 305 of FIG. 3B indicates that the development environment has 21,062 objects, while the production environment has 21,032 objects. Portion 306 of FIG. 3C indicates that the development environment has 2,170 synonyms, while the production environment has 1,608 synonyms. Portion 307 of FIG. 3C indicates that the development environment has 59 triggers, while the production environment has 3 triggers. Portion 308 of FIG. 3C indicates that, between the development environment and the production environment, there are 56 inconsistent triggers, 562 inconsistent synonyms, and 500 inconsistent procedures. Portion 309 indicates that the development environment has 59 inconsistent objects with respect to packages, and the production environment has 23 inconsistent objects with respect to packages. Portion 310 indicates that, of the inconsistent objects in the development environment, 48 packets are not available in production, and 11 columns are not matching in calculation view. Portion 311 indicates that, of the inconsistent objects in the production environment, 11 packages are not available in a quality environment, 1 package is not available in the production environment, and 11 columns are not matching in calculation view. Portion 312 of FIG. 3E indicates that there are 54 downward flow objects in the development environment, and 12 downward flow objects in the production environment. Portion 313 of FIG. 3E indicates that there are 94,683 upward flow objects in the development environment, and 62,613 updated flow objects in the production environment. Portion 314 of FIG. 3F indicates the quantity of objects for various objects types included in the development environment (13 for calculationview, 2 for hdbdd, 1 for hdbprocedure, 1 for hdbtable, 1 for hdbablefunction, 1 for xsaccess, 1 for xsapp, 1 for xsodata) while portion 315 of FIG. 3F indicates the quantity of objects for various object types included in the production environment (11 for calculationview, 2 for hdbdd, 1 for hdbprocedure, 1 for hdbtable, 1 for hdbtablefunction, 1 for xsaccess, 1 for xsaccess, 1 for xsapp, and 1 for xsodata).

Although FIGS. 3A-3F showed comparison between a development environment and production environment, comparison between any other environments and/or any other number of environments (e.g., three, four, five, etc.) can be shown. In some implementations, a user can select the environments that are to be compared, and the analysis compute device 120 can generate a comparison report based on the user's selections.

FIG. 4 shows a flowchart of a method 400 to reduce non-compliance of a database, according to an embodiment. In some implementations, method 400 is performed by a processor (e.g., processor 122).

At 401, metadata (e.g., metadata 126) representing a plurality of objects (e.g., objects 108) included in a database (e.g., database 106) is received. In some instances, the metadata could be received (e.g., in substantially real time) from a remote compute device (e.g., database compute device 100). In some instances, the plurality of objects is not received. In some instances, the plurality of objects is received, and the metadata is obtained from the plurality of objects.

At 402, a first set of objects from the plurality of objects that are compliant with a predetermined set of rules (e.g., rules 128) are identified using the metadata and not using the plurality of objects. In some implementations, 402 occurs automatically (e.g., without requiring human input) in response to completing 401.

At 403, a second set of objects from the plurality of objects that are not compliant with the predetermined set of rules are identified using the metadata and not using the plurality of objects. In some implementations, the second set of objects are different than the first set of objects. In some implementations, 403 occurs automatically (e.g., without requiring human input) in response to completing 401. In some implementations, 403 occurs automatically (e.g., without requiring human input) in response to completing 402. In some implementations, 403 occurs in parallel (at least partially) to 402.

At 404, a risk associated with each object from the second set of objects is determined. In some implementations, the rules are used to determine the risk. The risk could be indicated using any indicator, such as high risk, low risk, medium risk, security risk, privacy risk, malware risk, a number value, and/or the like. In some implementations, a risk associated with each object from the first set of objects is not determined (though in other implementations, a risk can be determined). In some implementations, 404 occurs automatically (e.g., without requiring human input) in response to completing 403.

At 405, based on at least one risk associated with at least one object from the second set of objects, at least one recommendation to modify the at least one object to reduce non-compliance of the database is provided. In some implementations, the at least one recommendation is determined based on the rules, such as a look-up table. Examples of recommendations include deleting the at least one object, modifying the at least one object, not using the at least one object, and/or the like. In some implementations, performing 405 can cause a database to transform such that the database is smaller, more accurate, runs faster, more efficient, more robust, has increased cybersecurity, and/or the like.

In some implementations of method 400, the predetermined set of rules are based on a set of predefined recommended best practices associated with the database. For example, the predefined recommended best practices may be provided by an organization that designed and/or sold the database and/or a component (e.g., software model) of the database.

In some implementations of method 400, the risk associated with each object from the set of objects is one of a high risk or a low risk. In some implementations of method 400, the risk associated with each object from the set of objects is a risk score based on the set of rules that object does not follow (or the set of rules that object follows).

In some implementations of method 400, the plurality of objects includes at least one of a view, a table function, or a procedure. In some implementations of method 400, each object from the plurality of objects is associated with at least one object type, the at least one object type being at least one of an analytic privilege, a calculation view, an attribute view, a procedure, a table function, or an analytic view.

In some implementations of method 400, providing the at least one recommendation at 405 includes providing a recommendation for each object from the second set of objects based on the risk associated with that object. In some implementations, the recommendations can be provided to a remote compute system (e.g., database compute device 100) via one or more electronic signals (e.g., in real time), such as a remote compute device associated with (e.g., accessibly by, owned by, operated by) a cybersecurity analyst, a software developer, a quality engineer, and/or the like.

Some implementations of method 400 further include sending at least one signal to cause display of a dashboard that includes compliance information based on the first set of objects, the second set of objects, and the risk associated with each object from the second set of objects (see, e.g., FIGS. 2 and/or 3).

In some implementations of method 400, the database is a relational database. In some implementations of method 400, the database is an in-memory, column-oriented, relational database.

In some implementations of method 400, the plurality of objects are from a plurality of different environments associated with the database, the plurality of different environments including at least one of a test environment, a development environment, a production environment, or a quality assurance environment. In some implementations of method 400, the plurality of objects are from a plurality of different environments associated with the database, the plurality of different environments including at least two environments from a test environment, a development environment, a production environment, and a quality assurance environment.

In some implementations of method 400, the set of objects includes at least one table that is unused and/or has a size greater than a predetermined threshold size. The predetermined threshold size may be, for example, the number of columns and/or rows of the at least one table, or a file size of the at least one table.

FIG. 5 shows a flowchart of a method 500 to improve alignment for a database by comparing objects from different environments of the database, according to an embodiment. In some implementations, method 500 is performed by a processor (e.g., processor 122).

At 501, metadata (e.g., metadata 126) representing a plurality of objects (e.g., objects 108) included in a database (e.g., database 106) are received. The database is associated with a first environment and a second environment different than the first environment. The first environment includes a first set of objects from the plurality of objects, and the second environment includes a second set of objects from the plurality of objects different from the first set of objects. In some instances, the metadata could be received from a remote compute device (e.g., database compute device 100). In some instances, the plurality of objects is not received. In some instances, the plurality of objects is received, and the metadata is obtained from the plurality of objects. In some implementations, indications of the first environment and second environment are based on input by a user (e.g., a user can manually select the first environment and the second environment). In some implementations, the first environment is one of a test environment, a development environment, a production environment, or a quality assurance environment. In some implementations, the database is a SAP HANA® database.

At 502, the first set of objects and the second set of objects are compared using the metadata, not using the plurality of objects, and for each category from a plurality of categories. The plurality of categories could include, for example, a schema count, a table count, a procedure count, a trigger count, a synonym count, a downward flow count, an upward flow count, a package count, an object count, an object type, and/or the like. In some implementations, the first set of objects and the second set of objects are compared based on rules (e.g., rules 128) including indications of the comparisons to make. In some implementations, 502 occurs automatically (e.g., without requiring human input) in response to completing 501.

At 503, for each category from the plurality of categories, at least one first signal is sent to cause display of comparison results associated with the comparing of the first set of objects to the second set of objects for that category. An example of an output that can be optionally displayed is shown at FIGS. 2 and/or 3. In some implementations, 503 occurs automatically (e.g., without requiring human input) in response to completing 502.

At 504, at least one object from at least one of the first set of objects or the second set objects is caused to be modified based on the comparing of the first set of objects to the second set of objects and to improve an alignment associated with the database. Examples of modifications include deleting the at least one object, modifying the at least one object, not using the at least one object, and/or the like. In some implementations, performing 504 can cause an environment (s) (and therefore the database) to transform such that the database can be smaller, more accurate, run faster, more efficient, more robust, has increased cybersecurity, and/or the like. In some implementations, 504 occurs automatically (e.g., without requiring human input) in response to completing 503.

In some implementations of method 500, the database is further associated with a third environment different than the first environment and the second environment. The third environment includes a third set of objects from the plurality of objects different from the first set of objects and the second set of objects. The comparing at 502 further includes comparing the first set of objects and the second set of objects to the third set of objects. The comparison results are further associated with the comparing of the first set of objects and the second set of objects to the third set of objects. In some implementations, the database is further associated with a fourth environment different than the first environment, the second environment, and the third environment. The fourth environment includes a fourth set of objects from the plurality of objects different from the first set of objects, the second set of objects, and the third set of objects. The comparing at 502 further includes comparing the first set of objects, the second set of objects, and the third set of objects to the fourth set of objects. The comparison results are further associated with the comparing of the first set of objects, the second set of objects, and the third set of objects to the fourth set of objects.

FIG. 6 shows a flowchart of a method 600 to improve alignment for a database by comparing objects from different environments of the database, according to an embodiment. In some implementations, method 600 is performed by a processor (e.g., processor 122).

At 601, metadata (e.g., metadata 126) representing a plurality of tables (e.g., included in objects 108) included in a database (e.g., database 106) are received. In some instances, the metadata could be received from a remote compute device (e.g., database compute device 100). In some instances, the plurality of tables is not received. In some instances, the plurality of tables is received, and the metadata is obtained from the plurality of tables. In some implementations, the database is a SAP HANA® database.

At 602, a first set of tables from the plurality of tables that are unused are identified using the metadata and not using the plurality of tables. An unused table may refer to a table that is not storing additional data. In some implementations, metadata associated with each table may indicate a name associated with that table, and the name can be used to determine if the table is unused (e.g., if the name includes "TEMP" or "TMP"). In some implementations, metadata associated with each table may indicate a count on the number of times a table has been accessed, where a count of zero can indicate an unused table. In some implementations, a table is identified as unused if the table has not been used for a period of time greater than a predetermined threshold (e.g., one day, one month, one year, etc.).

At 603, a second set of tables from the plurality of tables are identified using the metadata and not using the plurality of tables. Each table from the second set of tables has a size greater than a predetermined threshold. The predetermined threshold could be, for example, a count value, dimensions, a file size, and/or the like. In some implementations, the size refers to the number of columns being greater than the predetermined threshold, the number of rows being greater than the predetermined threshold, the file size of that table being greater than the predetermined threshold, and/or the like.

At 604, a third set of tables from the plurality of tables that are improperly partitioned are identified using the metadata and not using the plurality of tables. In some implementations, a table is identified as improperly partitioned if that table has been partitioned and holds less than a threshold amount of data.

At 605, at least one remedial action is performed based on at least one of the first set of tables, the second set of tables, or the third set of tables. Examples of remedial actions include using a table from the first set of tables, reducing a size of a table from the second set of tables, fixing an improperly partitioned table from the third set of tables, flagging a table from the first, second, or third set of tables, deleting a table from the first, second, or third set of tables, and/or the like. In some implementations, 605 occurs automatically (e.g., without requiring human intervention) in response to completing 602, 603, and/or 604.

The order that 602, 603, 604 are performed can vary in other implementations. For example, 602, 603, and 604 can happen sequentially in any order (e.g., automatically and without requiring human intervention between steps), in parallel, or a combination thereof (e.g., 602 occurs first, and 603 and 604 occur in parallel after 602 is completed).

Some implementations of method 600 further comprise identifying, using the metadata and not using the plurality of tables, a fourth set of tables from the plurality of tables that are partitionable. The performing of the at least one remedial action at 605 is further based on at least one of the first set of tables, the second set of tables, the third set of tables, or the fourth set of tables. In some implementations, a table is partitionable if the table has a number of rows and/or columns greater than a predetermined threshold (e.g., more than 10 rows and/or columns, more than 20 rows and/or columns, more than 100 rows and/or columns, more than 500 rows and/or columns, and/or the like) without having any partitions.

In some implementations of method 600, the at least one remedial action includes at least one of: sending at least one first signal to cause the first set of tables to be deleted, sending at least one second signal to cause the first set of tables to be used, sending at least one third signal to cause the size of the second set of tables to be less than the predetermined threshold, sending at least one fourth signal to cause the second set of tables to be partitioned, or sending at least one fifth signal to cause the third set of tables to be properly partitioned.

FIGS. 7 and 8 show screenshots of output that can be produced (e.g., by analysis compute device 120), according to an embodiment. In some implementations, the output is produced in a tabular format, such as from a .csv file. As can be seen in FIG. 7, each object can be associated with data such a package ID, object name, object suffix, model compliance, risk category, if script based view, if attribute view, and more not shown in FIG. 7 (e.g., if analytic view, if FULL JOIN used, if join cardinality unset, if UNION with NULL mapping, if input parameter/variable without dedicated F4 help, if STAR join recommended in this view, if KEEP FLAG used, if RANK NODE used, if calculated columns in early stages of the view, if classical analytic privilege, if analytic privilege type, if invalid column table in view, if datasource not in projection or aggr node of view, if no filter on datasource in view, if all columns from datasource projected in view, if calculated column used in filter or join, if LOOP in SCRIPT, if read write procedure without DML, statement, if deprecated procedure type, etc.). Of course, additional objects metadata not shown in FIG. 7 can exist/be used. As can be seen in FIG. 8, broken objects, the package ID for each broken object, object suffix, and more not shown in FIG. 8 (e.g., current version, active version, last change, last activation, etc.) can be produced.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™ and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

In some implementations, a network can be any suitable communications network for transferring data, operating over public and/or private networks. For example, a network can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, a network can be a wireless network such as, for example, a Wi-Fi or wireless local area network ("WLAN"), a wireless wide area network ("WWAN"), and/or a cellular network. In other instances, a network can be a wired network such as, for example, an Ethernet network, a digital subscription line ("DSL") network, a broadband network, and/or a fiber-optic network. In some instances, the network can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via the network can be encrypted or unencrypted. In some instances, the network can include multiple networks or subnetworks operatively coupled to one another by, for example, network bridges, routers, switches, gateways and/or the like.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method, comprising:
receiving, via a processor, metadata representing a plurality of objects included in a database, each object from the plurality of objects associated with at least one object type from a plurality of object types, the at least one object type being at least one of an analytic privilege, a calculation view, an attribute view, a procedure, a table function, or an analytic view;
identifying, via the processor, using the metadata, and not using the plurality of objects, a first set of objects from the plurality of objects that are compliant with a predetermined set of rules;
identifying, via the processor, using the metadata, and not using the plurality of objects, a second set of objects from the plurality of objects that are not compliant with the predetermined set of rules;
determining, via the processor and based on a rule from the predetermined set of rules, a first risk associated with a first object from the second set of objects;
determining, via the processor and based on the rule, a second risk associated with a second object from the second set of objects, the second risk different than the first risk; and
providing, via the processor and based on at least one of the first risk or the second risk, at least one recommendation to modify at least one of the first object or the second object to reduce non-compliance of the database.

2. The method of claim 1, wherein the predetermined set of rules are based on a set of predefined recommended best practices associated with the database.

3. The method of claim 1, wherein the first risk is lower than the second risk.

4. The method of claim 1, wherein the providing of the at least one recommendation includes providing, via the processor, a first recommendation for the first object based on the first risk and a second recommendation for the second object based on the second risk.

5. The method of claim 1, further comprising
sending, via the processor, at least one signal to cause display of a dashboard including compliance information based on the first set of objects, the second set of objects, the first risk, and the second risk, the dashboard not including the plurality of objects.

6. The method of claim 1, wherein the database is an in-memory, column-oriented, relational database.

7. The method of claim 1, wherein the plurality of objects are from a plurality of different environments associated with the database, the plurality of different environments including at least one of a test environment, a development environment, a production environment, or a quality assurance environment.

8. The method of claim 1, wherein the set of objects includes at least one table that is unused and/or has a size greater than a predetermined threshold size.

9. An apparatus, comprising:
a memory; and
a processor operatively coupled to the memory, the processor configured to:
receive metadata representing a plurality of objects included in a database, the database associated with a first environment, a second environment different than the first environment, and a third environment different than the first environment and the second environment, the first environment including a first set of objects from the plurality of objects, the second environment including a second set of objects from the plurality of objects different from the first set of objects, and the third environment including a third set of objects from the plurality of objects different from the first set of objects and the second set of objects;
compare using the metadata, not using the plurality of objects, and for each category from a plurality of categories, the first set of objects to the second set of objects, the first set of objects to the third set of objects, and the second set of objects to the third set of objects;
send, for each category from the plurality of categories, at least one signal to cause display of comparison results associated with the comparing of the first set of objects to the second set of objects for that category, the comparing of the first set of objects to the third set of objects for that category, and the comparing of the second set of objects to the third set of objects for that category; and cause, to improve an alignment associated with the database, at least one object from at least one of the first set of objects, the second set objects, or the third set of objects to be modified based on the comparing of the first set of objects to the second set of objects, the comparing of the first set of objects to the third set of objects, and the comparing of the second set of objects to the third set of objects.

10. The apparatus of claim 9, wherein the plurality of categories includes at least one of a schema count, a table count, a procedure count, a trigger count, a synonym count, a downward flow count, an upward flow count, a package count, an object count, or an object type.

11. The apparatus of claim 9, wherein the first environment is one of a test environment, a development environment, a production environment, or a quality assurance environment.

12. The apparatus of claim 9, wherein the database is a SAP HANA database.

13. The apparatus of claim 9, wherein:
the database is further associated with a fourth environment different than the first environment, the second environment, and the third environment,
the fourth environment includes a fourth set of objects from the plurality of objects different from the first set of objects, the second set of objects, and the third set of objects,
the comparing further includes comparing the first set of objects, the second set of objects, and the third set of objects to the fourth set of objects, and
the comparison results are further associated with the comparing of the first set of objects, the second set of objects, and the third set of objects to the fourth set of objects.

14. A non-transitory processor-readable medium storing code representing instructions to be executed by one or more processors, the instructions comprising code to cause the one or more processor to:
receive metadata representing a plurality of tables included in a database, the plurality of tables being from a plurality of different environments associated with the database, the plurality of different environments including at least one of a test environment, a development environment, a production environment, or a quality assurance environment;
identify, using the metadata and not using the plurality of tables, a first set of tables from the plurality of tables that are unused;
identify, using the metadata and not using the plurality of tables, a second set of tables from the plurality of tables, each table from the second set of tables having a size greater than a predetermined threshold;
determine, via the processor and based on a predetermined rule associated with the second set of tables, a risk associated with each table from the second set of tables, a first table from the second set of tables associated with a first risk and a second table from the second set of tables associated with a second risk different than the first risk;
identify, using the metadata and not using the plurality of tables, a third set of tables from the plurality of tables that are improperly partitioned; and
perform at least one remedial action based on at least one of the risk, the first set of tables, the second set of tables, or the third set of tables.

15. The non-transitory processor-readable medium of claim 14, wherein the code further comprises code to cause the one or more processors to:
identify, using the metadata and not using the plurality of tables, a fourth set of tables from the plurality of tables that are partitionable, the performing of the at least one remedial action further based on at least one of the first set of tables, the second set of tables, the third set of tables, or the fourth set of tables.

16. The non-transitory processor-readable medium of claim 14, wherein the at least one remedial action includes at least one of:
sending at least one first signal to cause the first set of tables to be deleted,
sending at least one second signal to cause the first set of tables to be used,
sending at least one third signal to cause the size of the second set of tables to be less than the predetermined threshold,
sending at least one fourth signal to cause the second set of tables to be partitioned, or
sending at least one fifth signal to cause the third set of tables to be properly partitioned.

17. The non-transitory processor-readable medium of claim 14, wherein the database is a SAP HANA database.

\* \* \* \* \*